United States Patent [19]

Reppert et al.

[11] Patent Number: 4,576,062
[45] Date of Patent: Mar. 18, 1986

[54] HIGH EFFICIENCY GEAR TRANSMISSION

[75] Inventors: Rudi Reppert, Fussen; Franz X. Zaunberger; Artur Kugler, both of Augsburg, all of Fed. Rep. of Germany

[73] Assignee: Zahnraderfabrik Renk, A.G., Augsburg, Fed. Rep. of Germany

[21] Appl. No.: 471,848

[22] Filed: Mar. 3, 1983

[30] Foreign Application Priority Data

Mar. 5, 1982 [DE] Fed. Rep. of Germany ....... 3207938

[51] Int. Cl.$^4$ ...................... F16H 37/00; F16D 23/00
[52] U.S. Cl. ........................................ 74/740; 74/764; 74/752 D; 192/0.09
[58] Field of Search ...................... 74/764, 740, 752 A, 74/765, 768, 769, 753, 752 D, 731, 732; 192/0.09, 103 R, 3.58, 0.076, 0.075, 0.055, 0.094, 0.032

[56] References Cited

U.S. PATENT DOCUMENTS

| 2,387,901 | 10/1945 | Haverstick | 74/752 D |
| 2,949,047 | 8/1960 | Burckhardt | 74/731 |
| 2,990,727 | 7/1961 | Miller | 74/765 |
| 3,023,632 | 3/1962 | Flinn | 74/732 |
| 3,033,333 | 5/1962 | Breting et al. | 74/765 |
| 3,150,544 | 9/1964 | Brass | 74/753 |
| 3,274,858 | 9/1966 | Meyer et al. | 74/768 |
| 3,578,117 | 5/1971 | Ahlen | 74/740 |
| 3,602,069 | 8/1971 | Mori | 74/753 |
| 3,946,622 | 3/1976 | Murakami et al. | 74/764 |
| 4,015,486 | 4/1977 | Zach, Jr. | 74/770 |
| 4,331,226 | 5/1982 | Heidemeyer | 192/0.076 |
| 4,407,398 | 10/1983 | Fiala | 192/0.076 |
| 4,428,467 | 1/1984 | Hiramatsu | 74/731 |
| 4,457,411 | 7/1984 | Hiramatsu | 192/3.58 |
| 4,468,988 | 9/1984 | Hiramatsu | 74/732 |

FOREIGN PATENT DOCUMENTS 2132262 7/1979 Fed. Rep. of Germany ... 74/752 D
3100465 12/1981 Fed. Rep. of Germany .

OTHER PUBLICATIONS

German brochure of Zahnrader fabrik Passau GmbH, "ZF8/5HW 806009", p. 7, no date available.

Primary Examiner—William F. Pate, III
Assistant Examiner—David Novais
Attorney, Agent, or Firm—Natter & Natter

[57] ABSTRACT

A mechanical gear transmission between an engine and a load includes shiftable speed change gearing. Brakes or clutches are provided for shift synchronization when changing to different speeds. Positioned between the engine and the gearing is a main synchronization element such as a clutch. The primary segment of the main synchronization element is driven by the engine output shaft while the secondary segment drives the input shaft of the speed change gearing. During a gear shift under load, the main synchronization element is maintained in a slip mode for a longer duration than the gearing synchronization element and provides the major portion of the total synchronization work. In alternate embodiments, the main synchronization element is combined with a planetary gearing for speed reduction on a pair of planetary gearings for reversing direction. A further embodiment incorporates a microprocessor controller and sensors for monitoring various engine and transmission functions. The microprocessor controller actuates the main and the gearing synchronization elements and may control the engine during a gear change.

15 Claims, 4 Drawing Figures

4,576,062

HIGH EFFICIENCY GEAR TRANSMISSION

TECHNICAL FIELD

The present invention relates generally to speed change gearing systems and more particularly to a mechanical transmission which includes a speed change gearing which is shiftable under load.

BACKGROUND ART

In prior mechanical speed change gearing systems which were shiftable under load, synchronization elements were required to match the rotating centrifugal masses on the drive side (principally the engine) with the rotating masses on the driven side. Heretofore, such synchronization elements comprised multiple disc clutches for each speed in the speed change gearing. With an engine of great centrifugal mass and/or high rotational speeds, e.g. a turbine engine, the shifting elements were required to be of correspondingly large dimensions and high masses. This resulted in excessive transmission weight, high no load losses and inferior transmission efficiencies.

It had been suggested to employ a hydrodynamic clutch between the engine and the speed change gearing. Because the slip of a hydrodynamic clutch was a function of the torque load applied, hydrodynamic clutches could not be precisely controlled to effect proper synchronization of the rotating masses. Additionally, because the hydrodynamic clutch could not operate without slip, a mechanical bridging clutch was also required.

DISCLOSURE OF THE INVENTION

A main synchronization clutch is provided between an engine and a mechanical speed change gearing which is shiftable under load. The speed change gearing includes synchronization elements such as clutches or brakes which are relatively low in mass compared with the rotating masses of the primary or drive side. The slip characteristics of the main synchronization clutch are such that it will function in a slip mode for a longer duration than the synchronization elements of the gearing and will thus absorb or transmit the major component of energy required to synchronize the rotating masses during each speed shifting cycle.

In alternate embodiments of the invention, the main synchronization clutch incorporates reduction gearing and/or direction reversing gearing. In a further embodiment, a microprocessor controller receives sensor signals from various operator engaged engine and transmission controls as well as engine and transmission speed sensors and automatically controls the main clutch, the synchronization elements, shift functions and engine functions.

From the foregoing compendium, it will be appreciated that it is an aspect of the present invention to provide a high efficiency gear transmission of the general character described which is not subject to the disadvantages of the prior art mentioned.

Another feature of the present invention is to provide a high efficiency gear transmission of the general character described which is relatively simple in construction and low in cost.

A further feature of the present invention is to provide a high efficiency mechanical gear transmission of the general character described which permits the use of reduced size synchronization elements in a speed change gearing as compared to that which would normally be required due to the characteristics of primary rotating masses.

A further feature of the present invention is to provide a high efficiency mechanical gear transmission of the general character described which employs a main synchronization element for the purpose of assuming the major proportion of synchronization work thereby permitting the use of reduced size synchronization elements in a speed change gearing.

Another aspect of the present invention is to provide a high efficiency mechanical gear transmission of the general character described which permits the implementation in a speed change gearing of shifting elements having minimal slippage characteristics, relatively small friction surfaces and reduced weight to thereby reduce no load losses.

A further aspect of the present invention is to provide a high efficiency mechanical gear transmission of the general character described which permits speed shifts without completely interrupting the drive torque transmitted from an engine having extremely great rotating centrifugal masses.

Another aspect of the present invention is to provide a high efficiency mechanical gear transmission of the general character described for use in a vehicle and which permits speed shifts without complete interruption of the tractive or braking force of an engine having large rotating centrifugal masses.

Yet another feature of the present invention is to provide a high efficiency mechanical gear transmission of the general character described which provides for automatic regulation of transmissible torque of speed change gearing synchronization elements as a function of an operator initiated shifting cycle.

Other aspects and features of the invention in part will be obvious and in part will be pointed out hereafter.

With these ends in view, the invention finds embodiment in certain combinations of elements, arrangements of parts and series of steps by which the said aspects and certain other aspects are hereinafter attained, all as more fully described with reference to the accompanying drawings and the scope of which is more particularly pointed out in the appended claims.

BRIEF DESCRIPTION OF THE DRAWINGS

In the accompanying drawings in which are shown some of the various possible exemplary embodiments of the invention.

BEST MODE FOR CARRYING OUT THE INVENTION

Figure 1:
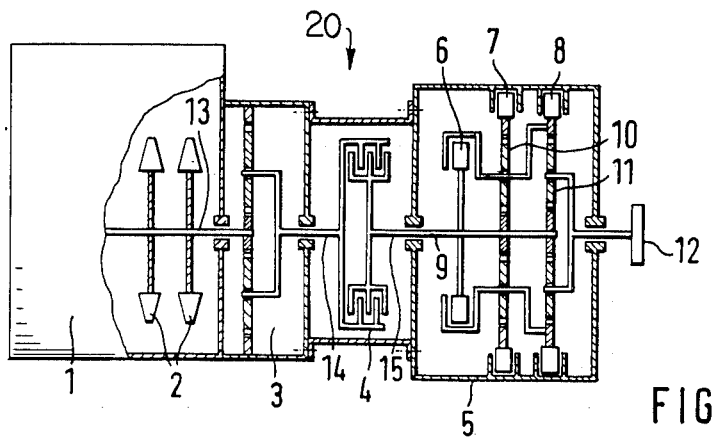
FIG. 1 is a schematized diagram of an engine drivingly connected to a high efficiency gear transmission constructed in accordance with a preferred embodiment of the present invention and showing a main synchronization element driven by an engine drive shaft and in turn driving a speed change gearing.

Referring now in detail to the drawings, the reference numeral 20 denotes generally a high efficiency gear transmission constructed in accordance with and embodying the invention. The transmission 20 is driven by an engine 1 such as a two shaft gas turbine engine having a pair of working turbine wheels 2 fixed to an engine output shaft 13. Due to the high rotational speeds of the turbine engine 1, the output shaft 13 and the working wheels 2 rotate with high centrifugal inertia.

In accordance with the present invention, a main synchronization element 4 is positioned between the engine output shaft 13 and the input shaft 9 of a speed change gearing 5. The main synchronization element 4 may comprise a clutch structured for major synchronization work. Interconnecting an input or primary shaft of the main synchronization element 4 to the output shaft 13 of the engine is a planetary stepdown gear 3.

The speed change gearing is shiftable under load and may comprise a pair of planetary gear trains 10 and 11 and a plurality of synchronization elements 6, 7 and 8 which may comprise multiple disc clutches or alternatively band brakes. The speeds of the speed change gearing 5 are shiftable under load without interruption of the drive between the engine 1 and the end load driven by the speed change gear output shaft 12.

In the prior transmission systems, the main synchronization element 4 was unknown so that during a shift cycle, the engine load torque, i.e. engine output torque which is a function of a power input from, for example, a throttle or gas pedal setting in an internal combustion engine, as well as the centrifugal energy of the rotating masses of the engine was braked or accelerated by the gearing input shaft 9 and the gearing synchronization elements 6, 7 and 8 until the gearing input shaft 9 adjusted its rotational speed to match that of the gearing which had been selected. In order to change the rotational speed of the gearing input shaft 9, it was necessary to change the rotational speed of the engine output shaft 13.

Whether the rotational speed change in engine output shaft required an input of energy or a dissipation of energy depended upon whether the shift cycle involved shifting to a lower or a higher speed. In either event, however, the speed compensation between the gearing input shaft 9 and the output shaft 12 occurred solely through the slipping of the synchronization elements 6, 7 and 8, and the shaft 9 bore the torque load required for the inertia change. Due to the high rotating masses on the drive side, the synchronization elements 6, 7 and 8, as well as the gearing input shaft 9, were required to be of relatively large size and capable of absorbing and/or transmitting substantial torque during slip stages until complete nonslip engagement was achieved.

When the speed change gearing 5 was shifted under load and the operator did not vary the engine throttle setting or only slightly varied the throttle setting, the synchronization elements 6, 7 and 8 were subjected to additional and correspondingly increased work loads.

Pursuant to the present invention, the main synchronization element 4 has been provided between the output shaft 13 of the engine and the input shaft 9 of the speed change gearing 5. In addition to the employment of the main synchronization element 4, the gearing synchronization elements 6, 7 and 8 and the input shaft 9 have been fabricated of reduced size due to their reduced work loads.

It should be appreciated that the illustrations shown in the drawings do not depict the actual components in true detail and are merely symbolic representations. Further, as employed herein it should be understood that the following terms should be construed to include the following definitions:

| | |
|---|---|
| LOAD TORQUE | Drive output torque of an engine as a function of a power input, e.g. a throttle setting |
| TRANSMISSIBLE TORQUE | The level at which a device can transmit applied torque without slippage |
| SLIP OPERATION or SLIP MODE | Relative rotation between the primary and secondary components of a torque transmitting element |

Returning now to the present invention, pursuant to which the main synchronization element 4 is provided between the engine output shaft 13 and an input shaft 9 of the speed change gearing 5, the main synchronization element may comprise a clutch or band brake or a hydrostatic clutch all of which are constructed to operate without slip between a primary or input shaft 14 and a secondary or output shaft 15. The main synchronization element 4 should be construed to include all mechanical clutch and brake elements which are selectively capable of operating without slip and thereby provide a transmissible torque. Inherently excluded for use as the main synchronization element 4 are hydrodynamic clutches which do not operate slip-free.

As will be hereinafter described, the main synchronization element 4 is controlled or regulated in such a way that the drive connection between its primary input shaft 14 and secondary output shaft 15 is, in normal driving, totally slip-free, and in addition during a shift operation it is never completely disengaged so that a torque load will at all times be transmitted from the engine output shaft 13 through the speed change gearing 5.

Pursuant to the present invention, the characteristics of the main synchronization element 4 are such that it assumes the predominant slip functions during a shift operation; for example, it assumes 80% of the work involved in synchronizing the centrifugal masses. The remaining synchronization work is provided by the selected synchronization elements 6, 7 and 8 of the speed change gearing 5. The synchronization elements 6, 7 and 8 are operated in a slip mode of operation for but a brief duration and thereafter become fully engaged for transmission of maximum transmissible torque without slippage. For such reason, the speed change gearing synchronization elements 6, 7 and 8 can be provided with reduced size, lower mass and smaller friction surfaces than currently employed synchronization elements of speed change gearings which are shiftable under load. In addition, with the main synchronization element in operation, the peak torque load of the input shaft 9 of the speed change gearing 5 will be significantly reduced so that it also can be made of lower mass than heretofore employed.

With respect to the main synchronization element 4, it is constructed to have a lower transmissible torque than the synchronization elements 6, 7 and 8 so that slip operation or mode readily occurs between the primary and secondary shaft 14, 15, respectively, of the main synchronization element when a shifting cycle commences. As a result of the slip operation of the main synchronization element 4, the respective synchronizatio elements 6, 7 or 8 are operated in slip operation for a shorter period of time and the rotational speed of the speed change gearing input shaft 9 is brought to the new speed without also bringing the engine output shaft 13 to its respective new speed. The coordination of the rotational speed of the engine output shaft 13 with the gearing input shaft 9 then takes place over a longer duration and by way of the slip operation of the synchronization element 4.

As a result, the synchronization work of the gearing synchronization elements 6, 7 and 8 consist essentially of the synchronization of the small mass centrifugal energy of the input shaft 9 and, because the main synchronization element 4 does not completely disengage, a small proportion of the synchronization work required to synchronize the high rotational mass centrifugal energy of the engine 1. It should be appreciated that the much greater proportion of the high rotational mass centrifugal energy is braked or accelerated by the main synchronization element 4. Due to the division of the synchronization work, the gearing synchronization elements 6, 7 and 8 are fabricated of reduced size, with lower cost and lighter weight than previously known speed change gearings which were shiftable under load. The cost and efficiency savings resulting from the employment of the reduced size gearing synchronization elements 6, 7 and 8 and the reduced size input shaft 9 greatly outweigh the cost of providing the main synchronization element 4.

Figure 2:
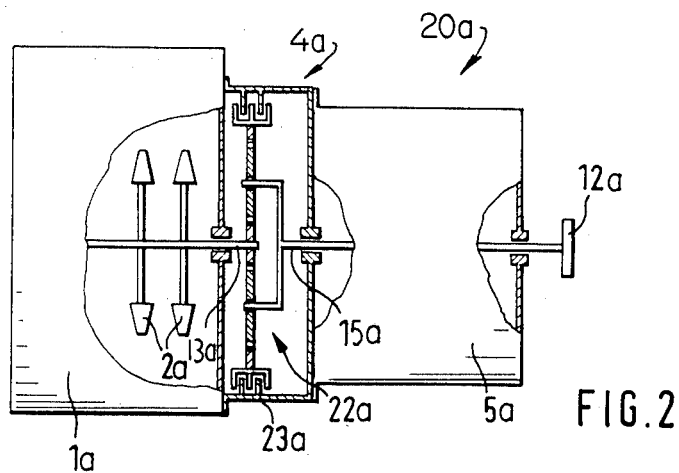
FIG. 2 is a schematized diagram of a further embodiment of the invention wherein a main synchronization assembly incorporates a planetary reduction gearing.

In FIG. 2 an alternate embodiment of the invention is illustrated. With reference to such embodiment, like numerals have been employed to designate components previously described, however bearing the suffix "a". In this embodiment, a turbine 1a includes a plurality of turbine working wheels 2a which are fixed to an output shaft 13a. A speed change gearing 5a substantially identical in construction to the speed change gearing 5 previously described is also employed. Interconnecting the speed change gearing 5a with the engine output shaft 13a is a main synchronization assembly 4a. The synchronization link 4a includes a planetary stepdown gear 22a which serves a speed reduction function similar to that of the planetary stepdown gear 3 of the prior embodiment. The main synchronization assembly 4a includes a synchronization element 23a in the form of a disc clutch one part of which is fixed to the transmission frame and the other part of which is fixed to the ring gear of the gear 22a. Alternatively, the synchronization element 23a may comprise a band brake which is fixed with respect to the transmission frame and which selectively engages the ring gear of the gear 22a.

It will be observed that the engine output shaft 13a comprises the primary input shaft of the main synchronization assembly 4a and an output shaft 15a fixed to a planet gear carrier comprises the secondary part of the main synchronization assembly 4a. The output shaft 15a is, in turn, fixed to an input shaft of the speed change gearing 5a.

Figure 3:
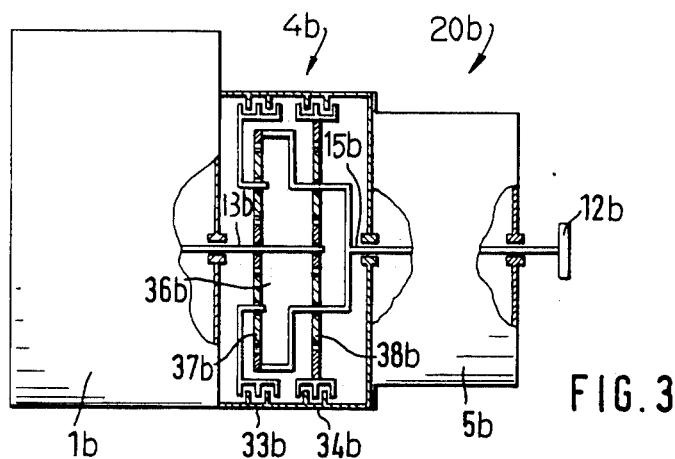
FIG. 3 is a schematized diagram of a further embodiment of the invention wherein the main synchronization assembly comprises a pair of clutch elements, each connected to a planetary gearing to provide direction reversal capabilities.

In FIG. 3, a further embodiment of the invention is illustrated, and like numerals have been employed to designate components previously described bearing the suffix "b". In this embodiment a turbine 1b includes an output shaft 13b which engages a main synchronization assembly 4b and drives the sun gears of a composite planetary reversing gear 36b. The gear 36b includes two successive planetary gear steps 37b and 38b. A synchronization element 33b in the form of a disc clutch or band brake is in engagement with the planet gear carrier of the gear step 37b, while a similar synchronization element 34b is in engagement with the ring gear of the planetary gear step 38b. One part of each synchronization element 33b, 34b is fixed to the transmission frame while the other is fixed to its respective gear step component.

The primary part of the main synchronization assembly 4b comprises the engine output shaft 13b and the secondary part comprises an output shaft 15b fixed to the ring gear of the gear step 37b as well as the planet carrier of the gear step 38b. The direction of rotation of the secondary part 15b will be dependent upon the engagement of the synchronization elements 33b and 34b.

In the forms of the present invention as disclosed in FIGS. 1, 2 and 3 the main synchronization elements 4, 23a and 33b or 34b are completely closed in normal driving and are not disengaged even during a shifting cycle but are only shifted to a slip operation with a certain minimum transmissible torque.

In a shifting cycle for a change of speed, the transmissible torque of the main synchronization element preceding the speed change gearing is reduced to a level below the slip torque of the shift synchronization elements 6, 7 and 8 of the speed change gearing 5. It should be understood that a minimum torque is still transmitted through the main synchronization element so as to avoid a complete interruption of the tractive or braking force of the engine.

After the shifting process has been completed in the speed change gearing, the transmissible torque of the main synchronization element is increased to a level above the load torque of the engine and the rotational speed of the engine is thus brought to the level of the new rotational speed of the input shaft (9, 9a or 9b) of the speed change gearing. The load torque of the engine is the drive torque which is adjusted by an operator, for example by an accelerator or throttle setting, without consideration of the centrifugal inertia of the engine.

Pursuant to the invention, it is advantageous to control or regulate the slipping torques of the main synchronization element as a function of the rotational speed and the respective drive torque of the engine in such a way that during a shifting cycle there is not too great a torque increase in the drive section between the engine and the speed change gearing as compared with the respective load torque of the engine. In addition, it is desirable to avoid an unduly lengthy slip operation. The influence on the transmissible torques can be effected in a known manner by regulating the actuation pressures of the main synchronization element and of the speed change gearing synchronization elements. In addition, if the engine is suitable therefor, an automatic reduction in the load torque may be effected simultaneously in a known manner.

Figure 4:
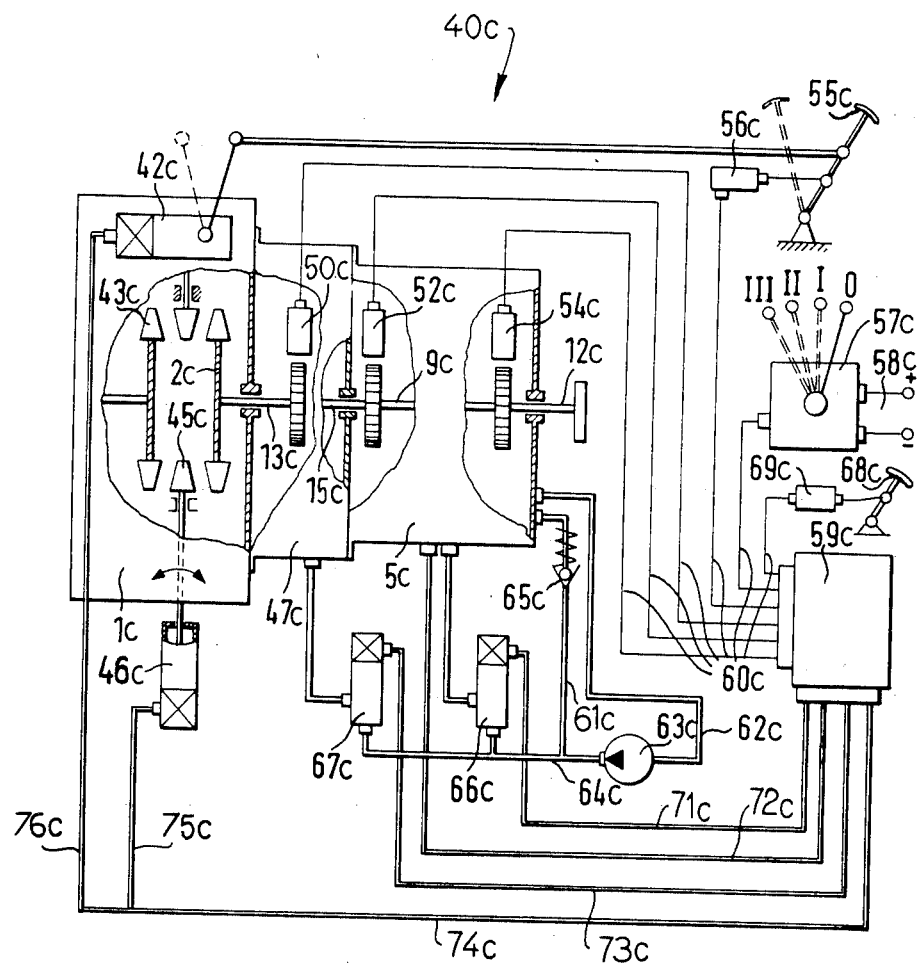
FIG. 4 is a schematized diagram of a further embodiment of the invention wherein a microprocessor controller receives input signals from various sensors which monitor engine functions and operator settings, rotational speeds within a speed change gearing and desired transmission shift settings and provides output signals for controlling a main synchronization assembly, synchronization elements within the speed change gearing, the speed change function itself and engine load torque.

An automated transmission and engine control system 40c is illustrated in FIG. 4. The system 40c includes a microprocessor for controlling the shifting cycle in accordance with the invention. In this embodiment like numerals are employed to denote components previously described with reference to the prior embodiments, however bearing the suffix "c". An engine 1c which, for example, comprises a two shaft gas turbine contains a working wheel 2c and a compressor wheel 43c and, in addition, an adjustable guide baffle 45c along with a baffle setting device 46c. A further engine control in the form of a power regulator 42c is actuated by a throttle, accelerator or fuel control pedal 55. The power regulator 42c controls fuel flow to the engine. If the engine is a turbine, the power regulator 42c may also control a guide baffle 45c.

A main synchronization assembly 47c is provided between an output shaft 13c of the engine and an input shaft 9c of a speed change gearing 5c. The main synchronization assembly 47c is similar in construction to any of the previously described embodiments of main synchronization assemblies and elements and includes a secondary part 15c comprising an output shaft which drives an input shaft 9c of the speed change gearing. The primary part of the main synchronization assembly 47c comprises the engine output shaft 13c.

In accordance with the invention, a rotational speed sensor 50c is positioned in the drive connection between the engine 1c and the main synchronization assembly 47c, for example at the output shaft 13c. A further rotational speed sensor 52c is located in the drive connection between the main synchronization assembly 47c and the speed change gearing 5c, for example at the input shaft 9c. A further rotational speed sensor 54c is located on the speed change gearing output shaft 12c. Monitoring the fuel control pedal 55c is a further sensor 56c which generates a signal indicative of the pedal position, hence the engine drive output or system "load torque". An additional sensor 69c monitors the position of a brake pedal 68c.

All of the sensors 50c, 52c, 54c, 56c and 69c are connected to a microprocessor controller 59c through one of a plurality of controller input lines 60c. Additionally, a speed shift selector 57c is supplied with current from a source 58c and generates a speed select signal which is transmitted to the microprocessor controller 59c through one of the input lines 60c.

The system of the present invention includes a plurality of system regulating devices which receive signals from the microprocessor controller 59c and a hydraulic system which is actuated by the various control regulators. The hydraulic system includes a suction line 62c connected with a fluid reservoir of the speed change gearing 5c, a pressure pump 63c connected with the reservoir through the suction lines 62c and a pressure line 64c. A bypass pressure relief valve 65c is positioned in a fluid line 61c interconnecting the pressure line 64c with the reservoir. The pressure line 64c extends to a valve 66c which is operated to provide hydraulic pressure to gear changing control elements of the speed change gearing 5c. Such speed change control elements are of conventional design and may comprise, for example, magnetic valves.

A further valve 67c is also connected to the pressure line 64c. The valve 67c is electrically actuated to provide hydraulic pressure to the main synchronization assembly 47c for controlled actuation of the main synchronization clutch or brake element thereof from an engaged nonslip mode to a slip operation during a shift cycle.

A plurality of output signal lines extend from the microprocessor controller 59c to the valves and other system regulating devices. One line 71c extends to the gear change valve 66c and controls the operation thereof. Another line 72c extends to a gear shift selector within the speed change gearing 5c for determining which speed ratio will become engaged. The signal on the line 72c thus determines which speed change control element will receive the fluid pressure when the valve 66c is opened. A further output signal line 73c extends from the microprocessor controller 59c to the valve 67c for actuation of fluid pressure for controlling the operation of the main synchronization assembly 47c.

Engine function controls are also provided from the microprocessor controller 59c through a signal channel 74c. The channel 74c includes two branches: one branch 75c extends to the baffle setting device 46c which comprises an electrically operated pneumatic control of conventional design having a vacuum or air pressure source (not shown). A further branch 76c of the channel 74c extends to the power regulator 42c which controls engine fuel supply. Signals on the branch 76c override the operator's fuel control pedal setting and control the output or load torque. A typical control signal from the microprocessor controller 59c would effectively reduce the load torque during a gear shifting cycle through control of the adjustable guide baffle 45c, the power regulator 42c or both.

The automated transmission control system 40c typically operates during a shifting cycle which may be initiated by an operator through the speed shift selector 57c or automatically through the output signal lines extending from the microprocessor controller 59c as a result of signals received from the sensors 54c and 56c. The actuating pressure and hence the transmissible torque of the main synchronization assembly 47c is regulated pursuant to the invention by the valve 67c in such a way that during a change of speed in the speed change gearing 5c, the torque of the main synchronization assembly 47c drops below the transmissible torque and hence below the slipping torque of the shifting elements of the speed change gearing 5c. Thereafter, after the speed shift has been completed in the speed change gearing 5c, the transmissible torque of the main synchronization assembly 47c is raised above the engine load torque but to a level still below the transmissible torque of the shifting elements of the speed change gearing 5c. Preferably, this procedure occurs simultaneously and as a function of the signals generated by the sensors 50c and 52c which signals are indicative of the rotational speeds of the primary side of the main synchronization assembly and of the input to the speed change gearing, respectively.

Additionally, if the engine is suitable, it is desirable to control the engine load torque during a shifting cycle. This can be achieved as previously described through microprocessor controller regulation of the power regulator 42c and/or turbine guide baffles 45c through the baffle setting device 46c. Depending on whether the speed shift is up or down, the automatic load torque control may increase the load torque; however generally a reduction in load torque is desired.

It is also advantageous to control the transmissible torque of the speed change gearing shifting elements as a function of the engine load torque, i.e. the set drive power of the engine. Such control is obtained by employment of the fuel control pedal sensor 56c in order to achieve a smooth shifting process.

In addition, the transmission system of the present invention with its main synchronization element is ideally suitable for drive systems where braking processes are carried out by reverse or down shifting in the speed change gearing and increasing the speed of the engine. For such purpose, a down shift cycle may be initiated when the brake pedal 68c is depressed and a resulting signal is provided by the sensor 69c.

The intermediate gears preceding the speed change gearing may comprise a stepdown gear as illustrated in the embodiment of FIG. 2 or a stepup gear or a reversing gear as illustrated in FIG. 3. In addition, a group gear, i.e. a speed shift gear, may be employed preceding the speed change gearing. If a group gear is employed, an additional speed change for each number of speeds can be shifted. Thus, if the speed change gearing includes a total of four speeds and the preceding group gear has two speeds, a total of eight speed steps are settable. It should be understood that pursuant to the invention the main synchronization assembly includes a main synchronizing element which may comprise a disc clutch or band brake, as well as support elements or shift elements of gear units which precede the speed change gearing. As previously discussed, such gear support or shift elements normally comprise friction clutches or brakes.

Thus, it will be seen that there is provided a high efficiency gear transmission which achieves the various features and aspects of the present invention and which is well suited to meet the conditions of practical usage.

As various modifications might be made in the invention above set forth, it is to be understood that all matter herein described or shown in the accompanying drawings is to be interpreted as illustrative and not in a limiting sense.

Having thus described the invention, there is claimed as new and desired to be secured by Letters Patent:

1. A mechanical transmission comprising a speed change gearing shiftable under load, the speed change gearing having input means, output means and mechanical speed shift torque transmissible means interconnecting the input and output means, the speed shift torque transmissible means being selectively disengageable to provide a slip mode of operation between the input means and the output means, and a main synchronization means, the speed shift torque transmissible means including a mechanical wear component, the mechanical wear component being subject to increased wear during the slip mode of operation, the main synchronization means including a primary part drivable by an engine output shaft and a secondary part drivingly engaging the speed change gearing input means, mechanical main torque transmissible means interconnecting the primary and secondary parts, the main torque transmissible means including a non-fluid torque coupling operable from a driving nonslip mode of operation wherein its transmissible torque is at least as great as the engine output load torque and shiftable to a slip mode of operation wherein reduced torque is transmitted from the primary part to the secondary part, the non-fluid torque coupling including a mechanical wear component subject to increased wear during the slip mode of operation, the wear component of the torque coupling being constructed to withstand greater wear than the wear component of the speed shift torque transmissible means, the main torque transmissible means uninterruptedly transmitting no less than a minimal torque between the primary part and the secondary part, the transmissible torque of the main torque transmissible means being less than the transmissible torque of the speed shift torque transmissible means, the main synchronization means providing the greatest proportion of synchronization work required for a shifting cycle when changing gear speeds, the remainder of such synchronization work being provided by the speed shift torque transmissible means so that reduced size speed shift torque transmissible means are employable thereby maximizing speed change gear efficiencies, the transmission further including means for automatically regulating the transmission whereby the non-fluid torque coupling is automatically shiftable from the nonslip mode to the slip mode during each speed change shift of the speed change gearing.

2. A mechanical transmission constructed in accordance with claim 1 wherein the speed change gearing includes a plurality of available gear speed ratios and a like plurality of speed shift torque transmissible means, each speed shift torque transmissible means being associated with a gear speed ratio.

3. A mechanical transmission constructed in accordance with claim 1 wherein the means for automatically regulating the transmission comprises means responsive to the output load torque of an engine driving the transmission and responsive to the difference between the speeds of the primary and secondary parts of the main synchronization means.

4. A mechanical transmission constructed in accordance with claim 1 further including means for automatically regulating the slip mode of the speed shift torque transmissible means.

5. A mechanical transmission constructed in accordance with claim 4 wherein the means for automatically regulating the slip mode of the speed shift torque transmissible means comprises means responsive to the load torque of an engine which drives the primary part of the main synchronization means and responsive to the difference between the speeds of the primary and secondary parts of the main synchronization means.

6. A vehicle drive system constructed in accordance with claim 1 further including a vehicle brake control, the regulating means including means responsive to operator actuation of the brake control for initiating an automatic speed change down shift cycle for braking the vehicle.

7. A mechanical transmission constructed in accordance with claim 1 wherein the main synchronization means includes intermediate gears, the main torque transmissible means comprising shifting or supporting elements of the intermediate gears.

8. A mechanical transmission constructed in accordance with claim 1 further including means for automatically adjusting the load torque of the engine during a shifting cycle.

9. A mechanical transmission constructed in accordance with claim 1 wherein the means for automatically regulating the transmission includes means providing a torque coupling slip mode duration longer than that of the speed change torque transmissible means.

10. A method of synchronizing rotational speeds of a mechanical transmission, the transmission comprising a speed change gearing having mechanical speed shift torque transmissible means interconnecting an input means and an output means and a main synchronization means interconnecting an engine output shaft and the speed change gearing, the main synchronization means including a primary part drivable by an engine output shaft, a secondary part drivingly engaging the speed change gearing input means and main torque transmissible means interconnecting the primary and secondary parts, the synchronizing method comprising the steps of (a) reducing the transmissible torque of the speed shift torque transmissible means and the main torque transmissible means during a gear change shift in the speed change gearing, the transmissible torque of the main torque transmissible means being reduced to a level less than the transmissible torque of the speed change torque transmissible means, (b) completing the gear change shift in the speed change gearing, (c) increasing the transmissible torque of the speed shift torque transmissible means to provide slip free operation, and (d) increasing the transmissible torque of the main torque transmissible means to a level less than the transmissible torque of the speed shift torque transmissible means but greater than the output load torque of the engine while maintaining a slip mode of operation until a rotational speed of the primary part of the main synchronization means equals the rotational speed of the secondary part of the main synchronization means.

11. A method of synchronizing rotational speeds in accordance with claim 10 wherein the main torque transmissible means is maintained in a slip mode for a longer duration than the speed shift torque transmissible means.

12. A method of synchronizing rotational speeds in accordance with claim 10 further including the steps of (e) determining the engine output load torque on a continual basis during the speed shift cycle, (f) determining the difference between the rotating speeds of the primary and secondary parts of the main synchronization element on a continual basis, and (g) controlling the transmissible torque of the main torque transmissible means and the transmissible torque of the speed shift torque transmissible means as a function of the determined load torque and speed difference.

13. A method of synchronizing rotational speeds in accordance with claim 18 further including the steps of (e) Monitoring the input and output speeds of the speed change gearing on a continual basis, (f) Monitoring the engine output load torque on a continual basis, (g) the step of increasing the transmissible torque of the speed shift torque transmissible means being conducted as a function of the monitored engine output torque.

14. A method of synchronizing rotational speeds in accordance with claim 10 further including the steps of (e) monitoring the load torque of the engine and (f) varying the engine load torque automatically for synchronization of rotating masses.

15. A method of synchronizing rotational speeds in accordance with claim 14 wherein the speed shift is to a higher gear ratio, the step of varying the engine load torque comprising reducing the engine load torque during such speed shift cycle.

* * * * *